W. B. HILL.
OPERATING DEVICE FOR STATION INDICATORS.
APPLICATION FILED DEC. 7, 1911.
1,047,806.
Patented Dec. 17, 1912.
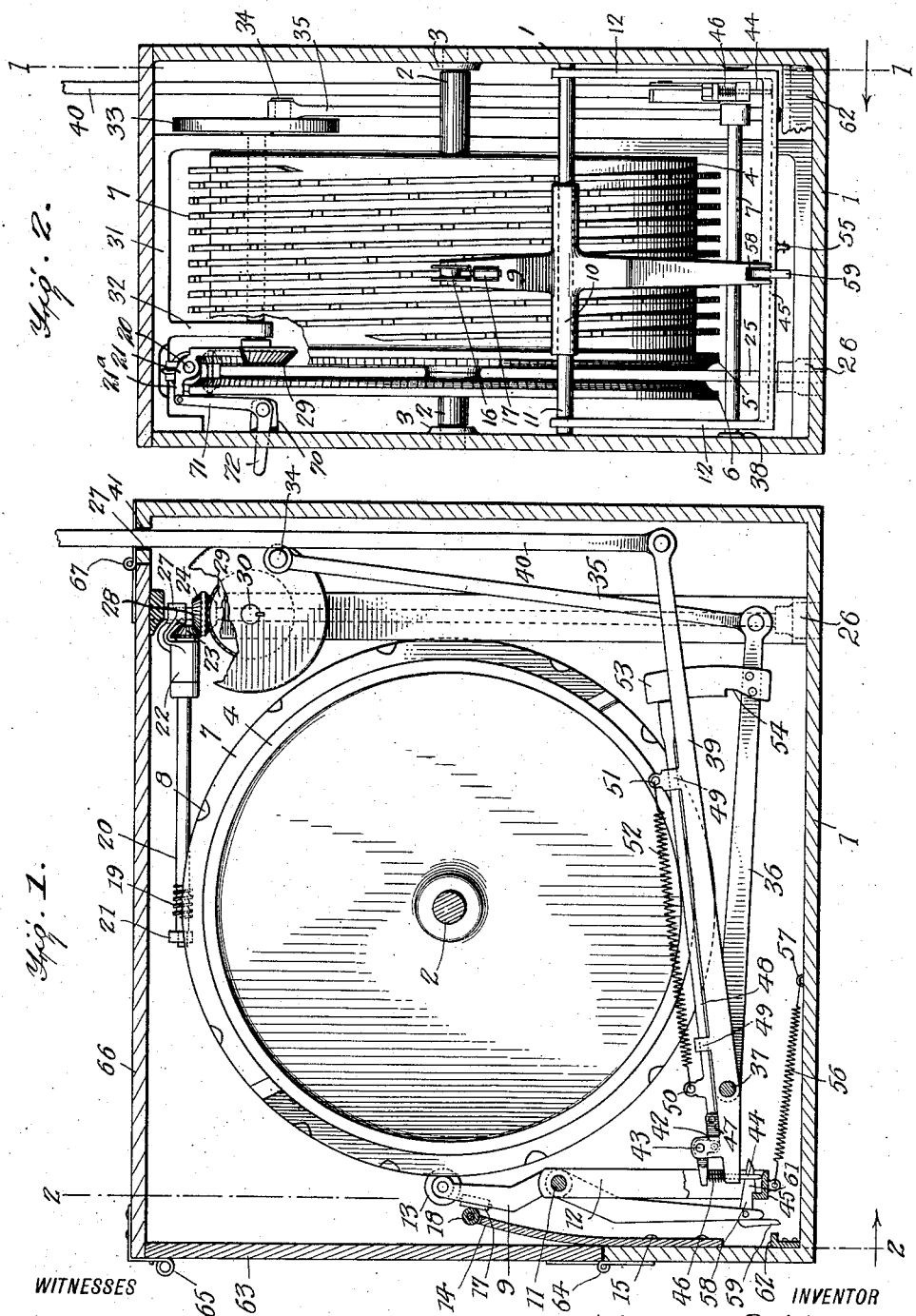
WITNESSES
*L. H. Schmidt*
*C. E. Traunor*
INVENTOR
WILLIAM B. HILL,
BY *Munn & Co.*
ATTORNEYS

UNITED STATES PATENT OFFICE.

WILLIAM B. HILL, OF TUCUMCARI, NEW MEXICO.

OPERATING DEVICE FOR STATION-INDICATORS.

1,047,806.  Specification of Letters Patent. Patented Dec. 17, 1912.

Application filed December 7, 1911. Serial No. 664,320.

*To all whom it may concern:*

Be it known that I, WILLIAM BUFORD HILL, a citizen of the United States, and a resident of Tucumcari, in the county of Quay, State of New Mexico, have invented a new and useful Improvement in Operating Devices for Station-Indicators, of which the following is a specification.

My invention is an improvement in operating devices for station indicators, of the type shown and described in my co-pending application Serial No. 630,781, filed June 2nd, 1911, and consists in certain novel constructions and combinations of parts hereinafter described and claimed.

In the drawings: Figure 1 is a section on the line 1—1 of Fig. 2; and Fig. 2 is a section on the line 2—2 of Fig. 1.

The present embodiment of the invention comprises a casing 1, in which is journaled a shaft 2 in bearings 3 in the ends of the casing, and a drum 4 is secured on the shaft. A worm wheel 5 is secured to one end of the drum, and a similar but oppositely arranged wheel 6 is secured to the shaft adjacent to the said end of the drum. A rib 7 is arranged on the peripheral surface of the drum, the said rib running spirally on the drum from near one face to near the other and extending radially from the drum, and the rib is provided at intervals with notches or depressions 8. The notches correspond in number and relative position to the number and relative position of the indications, that is, the streets or stations.

A lever 9 is provided intermediate its ends with a transverse elongated hub 10 which engages a shaft 11 journaled in walls of the casing and held parallel with the shaft 2. The upper end of the lever is provided with a roller 13 which bears against the rib 7 and is pressed toward the drum by one end of a spring 14, the other end of which is secured to the casing at 15. The roller 13 is provided with spaced annular flanges or ribs 16, and the rib 7 is received between the said ribs or flanges. A roller 17 is journaled in a recess in the lever near the roller 13 and on a vertical axis as shown, and the upper end of the spring 14 is provided with a roller 18 engaging the roller 17 and journaled on an axis at right angles to the roller 17.

The drum is operated by means of a worm 19 on a shaft 20 journaled transversely of the drum, the worm engaging one of the worm wheels 5 or 6. The shaft 20 is journaled in bearings 21 and 22 and is provided at the opposite end from the worm with a bevel gear wheel 23 meshing with a wheel 24 on a vertical shaft 25. The shaft 25 is journaled in the casing, and the bearing 22 is connected to and supported by a collar 27 on the shaft 25. The shaft 25 is also provided with a bevel gear 28 meshing with a larger gear 29 on a shaft 30 at right angles to the shaft 25 and journaled in a bracket 31 and in a hanger 32 depending from the bracket. The shaft 30 is provided at the opposite end from the gear wheel 29 with a disk 33 provided with a wrist pin 34. A link 35 is journaled at one end on the wrist pin and at the other is pivoted to one end of an arm 36. The opposite end of the arm is connected to a shaft 37 journaled in a bearing 38 in the casing. A lever 39 is journaled on the shaft near one end of the lever, and the end remote from the shaft is pivoted to one end of a link 40 which extends upwardly through a slot 41 in the top of the casing. The opposite end of the lever 39 is provided with an upright lug 42 on which is pivoted an elbow lever 43. A pin 44 passes vertically through the end of the lever 39 adjacent to the lug, and the upper end of the pin is engaged by one arm of the elbow lever. The lower end of the pin bears against an angle plate 45, having at each end an upwardly extending arm 12, each of which is journaled at its free end on the shaft 11, before mentioned, and the said angle plate 45 is supported by the said arms. A spring 46 encircles the pin between the lever and the arm of the elbow lever and acts normally to press the pin upwardly. The other arm of the elbow lever 43 is pivoted to one end of a link 47, whose other end is pivoted to a bar 48 slidable in bearings 49 on the upper face of the lever 39. The bar is provided with a lug 50 which is connected to a lug 51 on one of the bearings 49 by a spring 52.

An arc-shaped latch 53 is secured to the arm 36, and the upper end thereof bears against the adjacent end of the bar 48. The said latch 53 is provided with a notch 54 near the arm for engagement by the end of the bar. A lug 55 depends from approximately the center of the angle plate 45, and a spring 56 connects the lug with an eye 57 on the casing. A latch comprising arms 58 and 59 arranged at approximately a right angle with respect to each other is pivoted in a notch 60 in the lower end of the lever 9 and the arm 58 is provided with a catch 61 engaging the vertical side of the angle plate 45. The other arm 59 is in position for striking a lug 62 on the casing wall.

The casing is provided with a door 63 in one side wall hinged to the casing at 64 and held closed by a spring catch 65. The catch 65 is on a door 66 in the top of the casing, the said door being hinged at 67 to the casing, and the catch 65 acts to hold both doors closed.

The operating device is to be placed in an obscure place inside the coach, and connects to the indicator by means of the link 40. The lower end of shaft 25 has an enlarged portion 26 which is adapted to connect to another shaft to be extended in an upright position through the floor of the car, the lower end of the last named shaft being connected by suitable gearing to some rotating part of the car, or to a wheel to be secured to the truck of the car, and made to revolve by being held in contact with the rail, thus shaft 25 is kept continually in motion while the car is moving, and by means of the double beveled pinion 24 shafts 20 and 30 are revolved. To one end of shaft 30 is secured the crank wheel 33, having a crank pin 34 to which is attached one end of connecting rod 35, the other end of connecting rod 35 being attached to lever 36. Thus when the car is moving in either direction the lever 36 is kept continually in motion, and at the same time the drum 4 is being revolved by means of the worm 19. When one of the notches 8 on the spiral cam 7 is brought in position for engagement with the roller 13, the link 12 is swung to the left, (Fig. 1). This allows the pin 44 to be forced down through the short end of lever 39 by means of spring 52. As soon as notch 54 is raised in position for engagement with the end of link 48, the two levers 36 and 39 are forced downward together. When they reach their lowest point the short end of lever 39 is raised high enough to allow the link 12 to be swung to the right by means of spring 56, thereby replacing the stop 45 beneath the pin 44; stop 45 in the meantime having been released from the catch 61; as the two levers 36 and 39 are raised the pin 44 is pressed against stop 45 thereby sliding link 48 out of engagement with notch 54, it remaining out until roller 13 engages another notch on the spiral cam. Whenever the link 40 is moved downward, as before mentioned, the indicating device is operated to display another indication. It will be noted that the lever 39 remains in the position shown in the drawings except when the roller 13 moves into one of the notches 8 on the cam rib 7. At this time the lever 39 makes one stroke only, thereby operating the indicator.

The motion of the drum 4 is reversed by means of the worm wheels 5 and 6. The worm wheel 5 is directly connected to the shaft 2, while the worm wheel 6 is indirectly connected thereto in any suitable manner. The end of the shaft 20 adjacent to the worm 19 is journaled in the bearing 21, and the said bearing is provided with a lateral arm 21$^a$. An elbow lever is journaled on a bracket 70 in the casing 1 and one of the arms 71 of the elbow lever is pivoted to the arm 21$^a$ of the arm 21. The other arm 72, of the elbow lever extends outside of the casing 1, and may be used to swing the shaft 20 to bring the worm wheel 19 into engagement with either of the worm wheels 5 or 6. When the worm is in engagement with the worm wheel 5, the drum is rotated in one direction and when the said worm 19 is in engagement with the worm wheel 6 the drum is rotated in the opposite direction.

I claim:—

1. An operating device for station indicators, comprising a drum, a spiral rib on the drum provided with notches corresponding in number and relative position to the number and relative position of the stations, a lever pivoted intermediate its ends adjacent to the drum, a roller at the upper end of the lever engaging the rib, means for mounting the lever to permit the same to move laterally to follow the rib, an operating lever for the indicator pivoted at one end adjacent to the drum, and having the other end connected with the indicator for operating the same when the lever is vibrated, a vibrating lever pivoted intermediate its ends adjacent to the operating lever, means operated by the movement of the car for continuously rotating the drum and continuously vibrating the vibrating lever when the car is moving, a catch on the vibrating lever, a bar mounted for sliding movement on the operating lever, said bar being adapted to engage the catch when moved in one direction to cause the operating lever to move downward with the vibrating lever, a pin slidable vertically in the end of the operating lever adjacent to the lever provided with the roller, a stop for engagement by the lower end of the pin, said stop being mounted for swinging movement toward and from the pin, a spring normally pressing the stop into position for engagement by the lower end of the pin, a latch on the lower end of the roller lever for engaging the stop, an elbow lever pivoted on the operating lever and having one arm engaging the upper end of the pin, a connection between the other arm and the sliding bar, a spring normally pressing said bar into engagement with the catch, and a spring engaging the upper end of the roller lever for swinging the said lever when the roller enters a notch to release the pin and permit the sliding bar to engage the catch.

2. An operating device for station indicators, comprising a drum, a spiral rib on the drum provided with notches corresponding in number and relative position to the number and relative position of the stations, a lever pivoted intermediate its ends adjacent to the drum, a roller at the upper end of the lever engaging the rib, means for mounting the lever to permit the same to move laterally to follow the rib, an operating lever for the indicator pivoted at one end adjacent to the drum and having the other end connected with the indicator for operating the same when the lever is vibrated, a vibrating lever pivoted intermediate its ends adjacent to the operating lever, means operated by the movement of the car for continuously rotating the drum and continuously vibrating the vibrating lever, a bar mounted for sliding movement on the operating lever, a catch on the vibrating lever, said bar being adapted to engage the catch when moved in one direction to cause the operating lever to move downward with the vibrating lever, a spring normally pressing the bar into engagement with the catch, an elbow lever pivoted on the operating lever, one of the arms of the elbow lever being connected with the sliding bar, a stop mounted for swinging movement toward and from the elbow lever, a spring normally pressing the stop toward the elbow lever, a pin mounted for vertical sliding movement, the lower end of the pin normally engaging the stop and the upper end engaging the other arm of the elbow lever to prevent movement of the sliding bar toward the catch, a latch on the roller lever normally engaging the stop, and a spring pressing the roller toward the rib, and swinging the lever to disengage the stop from the pin when the roller enters a notch.

3. An operating device for station indicators, comprising a drum, a spiral rib on the drum provided with notches corresponding in number and relative position to the number and relative position of the stations, a lever pivoted intermediate its ends adjacent to the drum, a roller at the upper end of the lever engaging the rib, means for mounting the lever to permit the same to move laterally to follow the rib, an operating lever for the indicator pivoted at one end adjacent to the drum and having the other end connected with the indicator for operating the same when the lever is vibrated, a vibrating lever pivoted intermediate its ends adjacent to the operating lever, means operated by the movement of the car for continuously rotating the drum and continuously vibrating the vibrating lever when the car is moving, a catch on the vibrating lever, a bar mounted for sliding movement on the operating lever, said bar being adapted to engage the catch when moved in one direction to cause the operating lever to move downward with the vibrating lever, a spring normally pressing the bar into engagement with the catch, a stop mounted for swinging movement toward and from the bar, an elbow lever pivoted on the operating lever and having one arm connected with the sliding bar, means between the stop and the other arm of the elbow lever for preventing sliding movement of the bar toward the catch, a connection between the lower end of the roller lever and the stop for moving the said stop out of position for engagement by said means when the roller enters a notch, and yielding means pressing the roller toward the drum.

4. An operating device for station indicators, comprising a drum, a spiral rib on the drum provided with notches corresponding in number and relative position to the number and relative position of the stations, a lever pivoted intermediate its ends adjacent to the drum, a roller at the upper end of the lever engaging the rib, means for mounting the lever to permit the same to move laterally to follow the rib, an operating lever for the indicator pivoted at one end adjacent to the drum and having the other end connected with the indicator for operating the same when the lever is vibrated, a vibrating lever pivoted intermediate its ends adjacent to the operating lever, means operated by the movement of the car for continuously rotating the drum and continuously vibrating the vibrating lever when the car is moving, a catch on the vibrating lever, a bar mounted for sliding movement on the operating lever, said bar being adapted to engage the catch when moved in one direction to cause the operating lever to move downward with the vibrating lever, a spring normally pressing the sliding bar into engagement with the catch, means for holding the bar out of engagement with the catch, and a releasable connection between the said means and the lower end of the roller lever for releasing the said means when the roller enters a notch.

5. An operating device for station indicators, comprising a drum provided with a spiral rib having notches corresponding in number and relative position to the number and relative position of the stations, an operating lever for the indicator, a vibrating lever pivoted intermediate its ends adjacent to the drum, means on the said operating lever for engaging the vibrating lever to cause the operating lever to move with the vibrating lever to operate the indicator, means operated by the movement of the car for rotating the drum and vibrating the lever, means for normally restraining the operation of the said engaging means, a lever pivoted intermediate its ends adjacent to the drum and provided with a roller engaging the rib, means for mounting the said lever to permit it to move laterally to follow the rib, a connection between the lower end of the lever and the restraining means for operating the said restraining means to release the engaging means when the roller enters a notch, and yielding means normally pressing the roller toward the drum.

6. An operating device for station indicators, comprising a drum provided with a spiral rib having notches corresponding in number and relative position to the number and relative position of the stations, an operating lever for the indicator, a vibrating lever pivoted intermediate its ends adjacent to the drum, means on the said operating lever for engaging the vibrating lever to cause the operating lever to move with the vibrating lever to operate the indicator, means operated by the movement of the car for rotating the drum and vibrating the lever, means for normally restraining the operation of the said engaging means, a lever pivoted intermediate its ends adjacent to the drum and provided with a roller engaging the rib, means for mounting the said lever to permit it to move laterally to follow the rib, and a connection between the lower end of the lever and the restraining means for operating the said restraining means to release the engaging means when the roller enters a notch.

7. An operating device for station indicators, comprising a drum provided with a spiral rib having notches corresponding in number and relative position to the number and relative position of the stations, an operating lever for the indicator, a vibrating lever pivoted intermediate its ends adjacent to the drum, means on the said operating lever for engaging the vibrating lever to cause the operating lever to move with the vibrating lever to operate the indicator, means operated by the movement of the car for rotating the drum and vibrating the lever, means for normally restraining the operation of the said engaging means, a roller engaging the rib, means for mounting the roller to permit the said roller to move laterally to follow the rib, and a connection between the roller and the restraining means for operating the said restraining means to release the engaging means when the roller enters a notch.

WILLIAM B. HILL.

Witnesses:
MARILN I. LETCHER,
GENARO LUGO VERDEJA.

---

Copies of this patent may be obtained for five cents each, by addressing the "Commissioner of Patents, Washington, D. C."